(12) United States Patent
Weinmann et al.

(10) Patent No.: US 7,863,786 B2
(45) Date of Patent: Jan. 4, 2011

(54) DRIVE APPARATUS FOR A WASHING MACHINE

(75) Inventors: Martin Weinmann, Bad Waldsee (DE); Alexander Müller, Bad Waldsee/Reute (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 0 days.

(21) Appl. No.: 12/356,989

(22) Filed: Jan. 21, 2009

(65) Prior Publication Data

US 2009/0184674 A1    Jul. 23, 2009

Related U.S. Application Data

(63) Continuation of application No. PCT/EP2007/006173, filed on Jul. 12, 2007.

(30) Foreign Application Priority Data

Jul. 17, 2006 (DE) .................. 10 2006 033 317
Sep. 25, 2006 (DE) .................. 10 2006 045 146

(51) Int. Cl.
*H02K 11/00* (2006.01)
(52) U.S. Cl. .................. 310/68 C; 318/490; 310/62; 361/25
(58) Field of Classification Search ............ 310/68 C, 310/89, 85, 88, 62; 361/25; 318/490
See application file for complete search history.

(56) References Cited

U.S. PATENT DOCUMENTS

| | | | | |
|---|---|---|---|---|
| 3,975,832 A | * | 8/1976 | Mori et al. | 34/562 |
| 4,908,757 A | * | 3/1990 | Jensen et al. | 363/141 |
| 4,931,904 A | * | 6/1990 | Yiu | 361/695 |
| 4,963,778 A | * | 10/1990 | Jensen et al. | 310/68 D |
| 5,000,208 A | * | 3/1991 | Ludwig et al. | 134/58 R |
| 5,086,766 A | * | 2/1992 | Beacham | 128/203.27 |
| 5,436,519 A | * | 7/1995 | Takahashi et al. | 310/216.114 |
| 5,491,610 A | * | 2/1996 | Mok et al. | 361/695 |
| 5,532,533 A | * | 7/1996 | Mizutani | 310/68 B |
| 5,801,362 A | * | 9/1998 | Pearlman et al. | 219/400 |
| 6,031,306 A | * | 2/2000 | Permuy | 310/67 R |
| 6,169,345 B1 | | 1/2001 | Bloch et al. | |
| 6,175,171 B1 | | 1/2001 | Rupp et al. | |

(Continued)

FOREIGN PATENT DOCUMENTS

DE    3602606 A1    7/1987

(Continued)

*Primary Examiner*—Rita Leykin
(74) *Attorney, Agent, or Firm*—Laurence A. Greenberg; Werner H. Stemer; Ralph E. Locher

(57) ABSTRACT

A drive apparatus for a washing machine includes an electric motor, a drive shaft connected to the electric motor for rotary drive purposes and electronics for controlling operation of the electric motor. In order to achieve a compact construction, the electric motor and the electronics are integrated in a common unit. In order to increase operational reliability of the drive apparatus together with a simple construction, the common unit has a wall which is thermally coupled both to the electric motor and to the electronics and serves to dissipate heat. The electronics have a temperature sensor for detecting the temperature of the wall. Both the temperature of the electric motor and the temperature of the electronics can be monitored with this one temperature sensor.

11 Claims, 1 Drawing Sheet

U.S. PATENT DOCUMENTS

| | | |
|---|---|---|
| 6,268,669 B1 | 7/2001 | Wakao et al. |
| 6,341,507 B1 * | 1/2002 | Rode et al. .................. 68/12.16 |
| 6,394,767 B1 | 5/2002 | Matsumoto |
| 6,713,907 B2 | 3/2004 | Matsumoto |
| 7,345,386 B2 * | 3/2008 | Dano et al. .................... 310/61 |
| 7,362,550 B2 * | 4/2008 | Groening et al. ............... 361/27 |
| 7,521,826 B2 * | 4/2009 | Hempe et al. ................. 310/50 |
| 2003/0016392 A1 | 1/2003 | Kataoka |
| 2003/0066638 A1 * | 4/2003 | Qu et al. ...................... 165/186 |
| 2009/0101390 A1 * | 4/2009 | Kimata et al. ............... 174/250 |

FOREIGN PATENT DOCUMENTS

| | | |
|---|---|---|
| DE | 9017681 U1 | 11/1991 |
| DE | 19736300 A1 | 4/1998 |
| DE | 19714784 A1 | 10/1998 |
| DE | 19727165 A1 | 1/1999 |
| DE | 19703655 C2 | 1/2000 |
| DE | 10161367 A1 | 7/2003 |
| DE | 10252754 A1 | 6/2004 |
| DE | 19949914 B4 | 9/2005 |
| DE | 102004006702 A1 | 9/2005 |

* cited by examiner

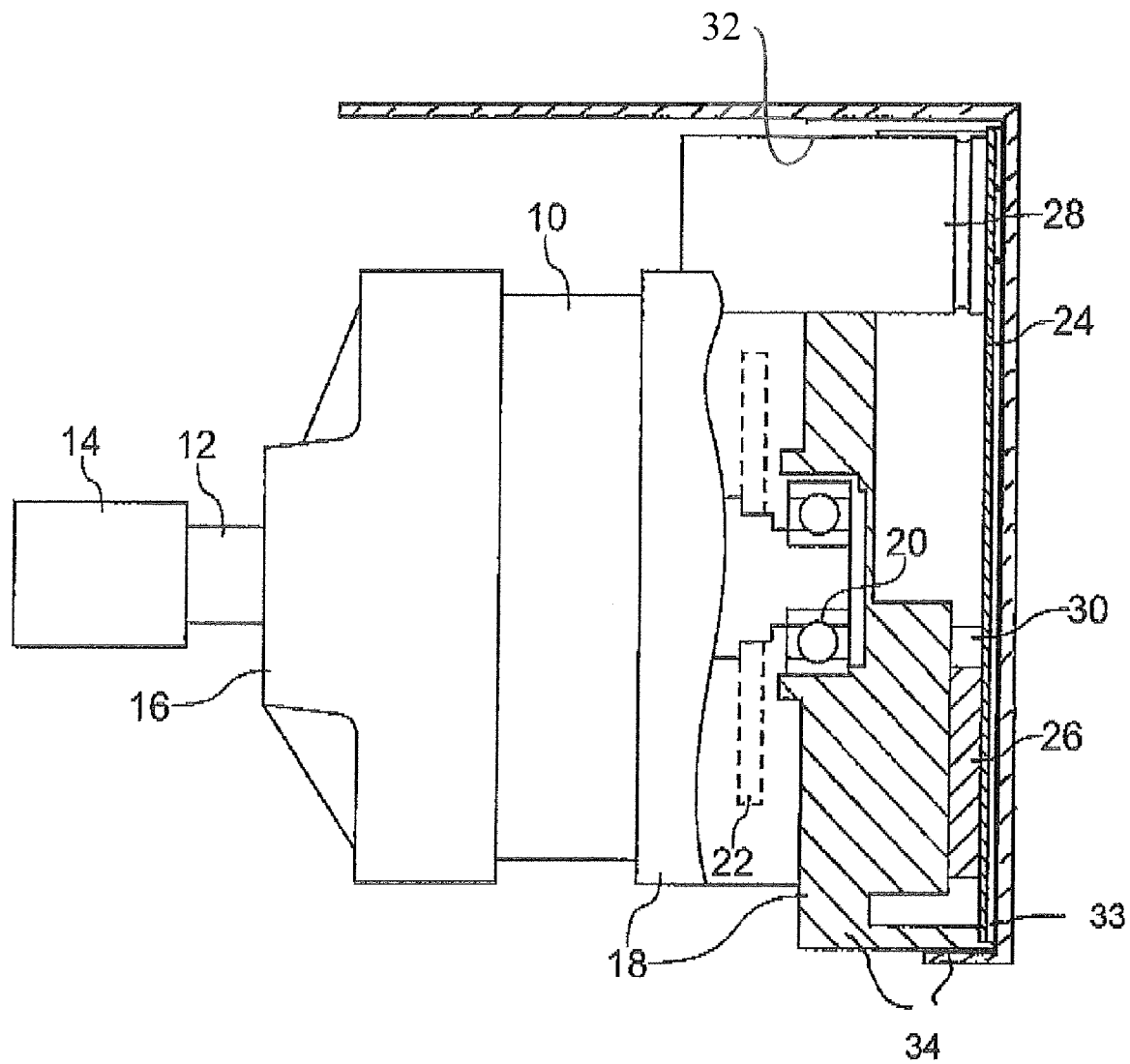

DRIVE APPARATUS FOR A WASHING MACHINE

CROSS-REFERENCE TO RELATED APPLICATIONS

This is a continuation, under 35 U.S.C. §120, of copending International Application No. PCT/EP2007/006173, filed Jul. 12, 2007, which designated the United States; this application also claims the priority, under 35 U.S.C. §119, of German Patent Applications DE 10 2006 033 317.9, filed Jul. 17, 2006, and DE 10 2006 045 146.5, filed Sep. 25, 2006; the prior applications are herewith incorporated by reference in their entirety.

BACKGROUND OF THE INVENTION

Field of the Invention

The present invention relates to a drive apparatus for a washing machine, including an electric motor, a drive shaft connected to the electric motor for rotary drive purposes and electronics for controlling operation of the electric motor.

A drive motor for a washing machine drum with an electronic control system is generally required in order to operate a washing machine. In commercially available washing machines, the electronic control system is predominantly disposed separately from the motor. That prevents heat from the motor and electrical and magnetic interference fields from being transmitted to the electronics.

However, some approaches are known which combine the motor electronics and the electric motor to form a compact unit. Those kinds of systems are known, for example, from German Utility Model DE 90 17 681 U1, German Patent DE 199 49 914 B4, U.S. Pat. No. 6,394,767 B1, U.S. Pat. No. 6,713,907 B2, German Published, Non-Prosecuted Patent Application DE 101 61 367 A1 corresponding to U.S. Pat. No. 7,345,386, and German Patent DE 197 03 655 C2. However, none of those documents describes a measure for monitoring the temperature of the electric motor and/or of the electronics, but relate only to various constructions for cooling the latter.

In order to monitor the temperature of an electric motor, it is known to place a temperature sensor in the immediate vicinity of a motor winding of the electric motor. The purpose of that temperature sensor is to interrupt the motor circuit as soon as the motor winding reaches a temperature which is critical for the coating insulation of the motor winding. As disclosed in German Published, Non-Prosecuted Patent Application DE 102 52 754 A1 for example, any type of thermal resistor, both with switching and non-switching characteristics, can be used as a temperature sensor of that type. Temperature sensors of that kind are, for example, silicon sensors (KTY sensors), bimetallic switches or service-mounted-network resistors (SMN resistors).

SUMMARY OF THE INVENTION

It is accordingly an object of the invention to provide a drive apparatus for a washing machine, which overcomes the hereinafore-mentioned disadvantages of the heretofore-known apparatuses of this general type and in which an electric motor and electronics are disposed in a compact unit and monitoring of the temperature of the electric motor and electronics in a simple manner is ensured at the same time.

With the foregoing and other objects in view there is provided, in accordance with the invention, a drive apparatus for a washing machine. The drive apparatus comprises an electric motor, a drive shaft connected to the electric motor for rotary drive purposes, and electronics for controlling operation of the electric motor. The electric motor and the electronics are integrated in a common unit. The common unit has a wall thermally coupled both to the electric motor and to the electronics. The electronics have a temperature sensor for detecting a temperature of the wall.

A compact construction is achieved by integrating the electric motor and electronics in a common unit. Since both the electric motor and the electronics (or their heat-generating power components) are thermally coupled to one wall of this common unit, the heat generated by the electric motor and electronics can be dissipated through this one wall in a compact manner. In addition, only one temperature sensor, which detects the temperature of this one wall, is required for monitoring the temperature of the electric motor and electronics. The component and assembly costs can be kept low due to the just one temperature sensor being required. In the case of this construction, the electric motor itself requires at most slight modifications and the additional space requirement for the electronics in the common unit is low.

In accordance with another feature of the invention, the thermal couplings between the wall and the electric motor on one hand and between the wall and the electronics on the other hand are configured in such a way that a critical temperature for the electric motor and a critical temperature for the electronics are reached at approximately the same measurement temperature of the temperature sensor during operation of the electric motor. In this way, the temperature of the wall detected by the temperature sensor only has to be compared with a threshold temperature value which is relevant both for the critical temperature of the electric motor and for the critical temperature of the electronics.

In accordance with a further feature of the invention, the wall is formed by a (rear) end plate for rotatably mounting the drive shaft and the rotor of the electric motor, and the electric motor and the electronics are each disposed on the averted sides of the wall.

In accordance with an added feature of the invention, a fan for cooling the wall is also preferably provided and is likewise disposed in the common unit in a compact manner.

In accordance with a concomitant feature of the invention, for the purpose of better protection against soiling, the electronics can be entirely or partially coated, encapsulated and/or provided with plastic covers.

Other features which are considered as characteristic for the invention are set forth in the appended claims.

Although the invention is illustrated and described herein as embodied in a drive apparatus for a washing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SINGLE VIEW OF THE DRAWING

The FIGURE of the drawing is a partially-sectional, side-elevational view of a drive apparatus for a washing machine according to a preferred exemplary embodiment of the invention.

DETAILED DESCRIPTION OF THE INVENTION

Referring now in detail to the single FIGURE of the drawing, there is seen a drive apparatus that contains an electric motor 10 which, in particular, contains non-illustrated stator cores and a rotor. The rotor is connected to a drive shaft 12 which transmits the rotary force which is generated by the electric motor 10 to a drum of the washing machine, for example through a belt pulley 14. However, as an alternative, it is also possible to couple the drive shaft 12 directly to the washing machine drum.

Since the electric motor 10 does not have to be modified and at most has to be slightly modified in comparison to conventional drive apparatuses for washing machines, a detailed description of the electric motor has been omitted. The electric motor 10 can, in particular, be both an asynchronous motor and a synchronous motor with one phase or with more than one phase.

The drive shaft 12 or the rotor of the electric motor is rotatably held on a front A-end plate 16 through the use of a corresponding non-illustrated mount and on a rear B-end plate 18 through the use of a corresponding mount 20. These end plates 16, 18 are used to mount the drive apparatus in a washing machine, for example through the use of screw connections.

In addition, a fan 22 for generating a cooling air stream for cooling the electric motor 10 and, in particular, the rear end plate 18, is optionally provided between the two end plates 16, 18 in a conventional manner. The fan 22 is, for example, made up of a fan impeller which is mounted on the drive shaft 12 and is rotated with the drive shaft. The fan impeller is therefore automatically rotated at the same rotational speed as the drive shaft 12, with the result that a more intense cooling air stream is automatically generated by the fan 22 at a higher rotational speed or power of the electric motor 10. The invention is not restricted only to this embodiment and configuration of the fan 22. For example, the fan can also be provided in the drive apparatus separately from the drive shaft 12.

The washing machine drive apparatus also has electronics for controlling the electric motor 10, in particular for supplying power to and controlling the rotational speed of the electric motor. These electronics include, in particular, a printed circuit board 24 on which, inter alia, various power components 26, 28 are mounted. In a drive which is fed by an intermediate circuit and has an asynchronous or synchronous motor, these power components 26, 28 are, for example, intermediate circuit capacitors, choking coils for upper harmonics and radio interference suppression coils, mains rectifiers and switch-on current limiters, such as an NTC or fixed resistor.

The external shape of the motor scarcely differs from that of a conventional washing machine drive, with the only difference being that the rear end plate 18 is somewhat modified. The rear end plate 18 forms a partition wall (the wall of the invention) of the common unit. The electric motor 10 is disposed on one side of the partition wall and the electronics for controlling and supplying power to the electric motor 10 (rotational-speed control system, single-phase or multi-phase voltages of variable frequency and amplitude) are disposed on the other side. The sensitive regions of the electronics are shielded from electrical and magnetic interference fields of the electric motor 10 by the end plate 18.

The end plates 16, 18 are firmly connected to the core of the stator of the electric motor 10, with the result that they are heated up by the core as the motor winding heats up. This heat is dissipated by the end plates 16, 18 which are cooled by the (optional) fan 22 and its connections to the washing machine drum housing. At least some of the heat-generating power components 26 of the electronics are likewise in thermal contact with the rear end plate 18 since the power components 26 are pressed into close contact against the rear face of the end plate 18. In this way, the end plate 18 is heated up both by the electric motor 10 and the electronics or their power components 26, and both the electric motor 10 and the power components 26 are cooled by the common wall 18 of the common unit of the drive apparatus.

The electronics 24-30 also contain a temperature sensor 30 for detecting the temperature of the rear end plate 18. The temperature sensor 30 is, for example, pressed firmly against the rear face of the end plate 18 for the purpose of good thermal coupling. In this case, the temperature sensor 30 can, in principle, be provided as any type of temperature-detecting apparatus. When a critical temperature is detected by the temperature sensor 30, the electronics 24-30 switch off the electric motor 10. The electric motor 10 and electronics 24-30 can be protected against overheating with only one measurement point.

In one preferred embodiment, the thermal coupling between the electric motor 10 and the end plate 18 on one hand, and the thermal coupling between the power components 26 and the end plate 18 on the other, are configured in such a way that the critical temperature for the power components 26 and the critical operating temperature for the electric motor 10, that is to say in particular for an insulation system of coated wire of the motor winding, are reached at virtually the same measurement temperature on the end plate 18 at the measurement point of the temperature sensor 30. In this way, the temperature detected by the temperature sensor 30 has to be compared with only one threshold temperature value which is applicable both for the electric motor and for the electronics.

The above-described principle can be realized both with integrated and with discrete power components 26 and temperature sensors 30.

As is indicated in the FIGURE, the rear end plate 18 can also have an aperture 32, and some of the power components 28 of the electronics, which are usually not at risk of soiling or can be simply constructed in such a way that they are not at risk of soiling, can protrude at least partially through the aperture and thus can be cooled directly by the cooling air stream generated by the fan 22.

The above-described washing machine drive therefore constitutes a simple, compact and cost-effective apparatus integrating an electric motor and electronics with effective temperature monitoring both of the electric motor and the electronics, which ensures sufficient protection and sufficient cooling of the electronics at the same time.

It is possible to take various additional measures in order to better protect the electronics 24-30 against soiling. For example, the electronics can be entirely or partially coated and/or entirely or partially encapsulated. Encapsulation can be done by potting. The electronics can also be entirely or partially covered with plastic parts 33. Together with the rear end plate 18 a common motor housing 34 can be shaped. This housing can protect the motor as well as the electronic from soiling and splash water.

Whereas the printed circuit board 24 of the electronics is disposed behind the end plate 18 and is surrounded by a motor cover 33 in the above-described exemplary embodiment, it is also feasible to modify the rear end plate 18 in such a way that the electronics 24-30 can be accommodated within the end plate 18.

The invention claimed is:

1. A drive apparatus for a washing machine, the drive apparatus comprising:
   an electric motor;
   a drive shaft connected to and rotationally driven by said electric motor;
   electronics for controlling operation of said electric motor;
   said electric motor and said electronics being integrated in a common unit;
   said common unit having a wall being thermally coupled both to said electric motor and to said electronics; and
   said electronics having a temperature sensor for detecting a temperature of said wall.

2. The drive apparatus according to claim 1, wherein said thermal couplings between said wall and said electric motor as well as between said wall and said electronics are configured to cause a critical temperature for said electric motor and a critical temperature for said electronics to be reached at approximately the same measurement temperature of said temperature sensor during operation of said electric motor.

3. The drive apparatus according to claim 1, wherein said electronics include heat-generating power components pressed into close contact against said wall.

4. The drive apparatus according to claim 1, wherein said wall is formed by an end plate for rotatably mounting said drive shaft and a rotor of said electric motor.

5. The drive apparatus according to claim 1, wherein said electric motor is disposed on one side of said wall and said electronics are disposed on another side of said wall.

6. The drive apparatus according to claim 1, which further comprises a fan additionally provided in said common unit for cooling said wall.

7. The drive apparatus according to claim 1, wherein said electric motor and said electronics are integrated in a common motor housing.

8. The drive apparatus according to claim 1, wherein said electronics are entirely or partially coated for protection against dust and/or moisture.

9. The drive apparatus according to claim 1, wherein said electronics are entirely or partially encapsulated by potting.

10. The drive apparatus according to claim 1, wherein said electronics are entirely or partially provided with plastic covers.

11. The drive apparatus according to claim 1, wherein said wall is substantially rectangular.

* * * * *